United States Patent
Takagi et al.

(10) Patent No.: US 8,776,586 B2
(45) Date of Patent: Jul. 15, 2014

(54) FAILURE DETECTION APPARATUS FOR AN ELECTRICALLY HEATED CATALYST

(75) Inventors: Naoya Takagi, Mishima (JP); Mamoru Yoshioka, Susono (JP); Takashi Watanabe, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/994,570

(22) PCT Filed: Dec. 15, 2010

(86) PCT No.: PCT/JP2010/072560
§ 371 (c)(1),
(2), (4) Date: Jul. 10, 2013

(87) PCT Pub. No.: WO2012/081094
PCT Pub. Date: Jun. 21, 2012

(65) Prior Publication Data
US 2013/0291630 A1    Nov. 7, 2013

(51) Int. Cl.
*G01M 15/10* (2006.01)
(52) U.S. Cl.
USPC .................................. 73/114.75; 73/114.73
(58) Field of Classification Search
USPC ............... 73/114.69, 114.71, 114.72, 114.73, 73/114.75
See application file for complete search history.

(56) References Cited

U.S. PATENT DOCUMENTS

| | | | |
|---|---|---|---|
| 5,727,383 A | 3/1998 | Yamashita et al. | |
| 5,729,971 A * | 3/1998 | Matsuno et al. | 60/277 |
| 5,904,902 A | 5/1999 | Matuoka et al. | |
| 5,916,130 A * | 6/1999 | Nakae et al. | 60/276 |
| 6,898,927 B2 * | 5/2005 | Morinaga et al. | 60/284 |
| 2002/0139110 A1 | 10/2002 | Brown | |
| 2003/0070423 A1 | 4/2003 | Morinaga et al. | |
| 2012/0023913 A1 * | 2/2012 | Yoshioka et al. | 60/285 |

FOREIGN PATENT DOCUMENTS

| | | |
|---|---|---|
| DE | 196 45 577 A1 | 5/1997 |
| DE | 102 11 345 A1 | 10/2002 |
| JP | 5 248234 | 9/1993 |
| JP | 7 269330 | 10/1995 |
| JP | 8 28252 | 1/1996 |
| JP | 8 338235 | 12/1996 |
| JP | 9 4438 | 1/1997 |
| JP | 2003 120382 | 4/2003 |

OTHER PUBLICATIONS

International Search Report Issued Mar. 8, 2011 in PCT/JP10/072560 filed Dec. 15, 2010.

* cited by examiner

*Primary Examiner* — Eric S McCall
(74) *Attorney, Agent, or Firm* — Oblon, Spivak, McClelland, Maier & Neustadt, L.L.P.

(57) ABSTRACT

Whether or not an electrically heated catalyst is normal is detected by accurately detecting whether the temperature of the electrically heated catalyst has gone up. To this end, provision is made for an air fuel ratio control device that adjusts an air fuel ratio of an exhaust gas flowing into the electrically heated catalyst to a rich air fuel ratio, at the time of starting of an internal combustion engine, a downstream side detection device that is arranged at the downstream side of the electrically heated catalyst and detects a concentration of oxygen in the exhaust gas, and a determination device that determines whether the electrically heated catalyst is electrically energized, based on the time at which the oxygen concentration detected by the downstream side detection device changes to a value indicating a rich air fuel ratio at the time when the air fuel ratio of the exhaust gas is adjusted by the air fuel ratio control device to the rich air fuel ratio, after starting of the internal combustion engine.

6 Claims, 9 Drawing Sheets

FAILURE DETECTION APPARATUS FOR AN ELECTRICALLY HEATED CATALYST

TECHNICAL FIELD

The present invention relates to a failure detection apparatus for an electrically heated catalyst.

BACKGROUND ART

There has been know a technique in which a catalyst carrier having electric resistance is electrically energized, so that the temperature of a catalyst is raised at the time of cold start of an internal combustion engine, thereby attaining early activation of the catalyst (for example, refer to a first patent document). In addition, there has also been known a technique of determining an abnormality of a catalyst based on an output value of an oxygen concentration sensor, which is arranged at the downstream side of the catalyst (for example, refer to a second patent document). Moreover, there has also been known a technique in which when an inversion period of rich and lean states of an air fuel ratio, which is detected by an oxygen sensor arranged at the downstream side of a catalyst, has exceeded a predetermined period of time, a determination is made that the catalyst has been activated, and an amount of heat required from the time of engine starting until the activation of the catalyst is estimated, so that the deterioration of the catalyst is determined according to an integrated value of the amount of heat (for example, refer to a third patent document).

However, the temperature of an electrically heated catalyst will not go up unless it is electrically energized. For this reason, if the temperature of the electrically heated catalyst is known, it can be determined whether the electrically heated catalyst is electrically energized, so it is possible to detect a failure of the electrically heated catalyst. Here, it is considered that when determining whether the electrically heated catalyst is electrically energized, a temperature sensor is mounted on a heat generation element, for example. However, for example, SiC, which is used for the heat generation element of the electrically heated catalyst, is hard and brittle. In addition, it is hard for this material to perform thermal expansion, and hence it is difficult to embed the temperature sensor therein. Besides, it adds the cost for such processing and the cost for adding the temperature sensor. Moreover, it is also considered that the electric resistance of the heat generation element is measured and the temperature of the heat generation element is then estimated based on the electric resistance thus measured, but the relation between the temperature of the heat generation element and the electric resistance thereof may sometimes change, so it may be difficult to obtain the temperature in an accurate manner.

PRIOR ART REFERENCES

Patent Documents

First Patent Document: Japanese patent application laid-open No. H05-248234
Second Patent Document: Japanese patent application laid-open No. 2003-120382
Third Patent Document: Japanese patent application laid-open No. H09-004438

SUMMARY OF THE INVENTION

Problems to be Solved by the Invention

The present invention has been made in view of the above-mentioned problems, and has for its object to detect whether or not an electrically heated catalyst is normal, by accurately detecting whether the temperature of the electrically heated catalyst has gone up.

Means for Solving the Problems

In order to achieve the above-mentioned object, the present invention resides in a failure detection apparatus for an electrically heated catalyst which is arranged in an exhaust passage of an internal combustion engine and is electrically energized to generate heat thereby to heat a catalyst, wherein said apparatus comprises:

an air fuel ratio control device that adjusts an air fuel ratio of an exhaust gas flowing into said electrically heated catalyst to a rich air fuel ratio, at the time of starting of said internal combustion engine;

a downstream side detection device that is arranged at the downstream side of said electrically heated catalyst and detects a concentration of oxygen in the exhaust gas; and a determination device that determines whether said electrically heated catalyst is electrically energized, based on the time at which the oxygen concentration detected by said downstream side detection device changes to a value indicating a rich air fuel ratio at the time when the air fuel ratio of the exhaust gas is adjusted by said air fuel ratio control device to a rich air fuel ratio, after starting of said internal combustion engine.

Here, in a period of time which is required for the determination device to make a determination, the air fuel ratio control device should adjust the air fuel ratio of the exhaust gas to a rich air fuel ratio. In addition, the determination device may make a determination only in a period of time in which the air fuel ratio of the exhaust gas is adjusted to a rich air fuel ratio by means of the air fuel ratio control device. The temperature of the catalyst goes up by electrically energizing the electrically heated catalyst. By doing so, oxygen is stored in the catalyst. When the air fuel ratio of the exhaust gas passing through the catalyst becomes a rich air fuel ratio, the oxygen stored in the catalyst will be released from the catalyst. In addition, during the time when the oxygen is released from the catalyst, the air fuel ratio of the exhaust gas at the downstream side of the electrically heated catalyst substantially becomes a stoichiometric air fuel ratio.

However, when the electrically heated catalyst fails and the temperature of the catalyst does not go up, oxygen is not stored in the catalyst, and so, oxygen is not released therefrom even if the air fuel ratio of the exhaust gas passing through the catalyst becomes a rich air fuel ratio. For this reason, the air fuel ratio of the exhaust gas at the downstream side of the electrically heated catalyst soon becomes a rich air fuel ratio. Thus, the time when the oxygen concentration detected by the downstream side detection device changes to a value indicating a rich air fuel ratio varies according to the temperature of the electrically heated catalyst. That is, based on the time when the oxygen concentration detected by the downstream side detection device changes to a value indicating a rich air fuel ratio, it can be determined whether the temperature of the electrically heated catalyst goes up. Then, if the temperature of the electrically heated catalyst goes up, the electrical energization to the electrically heated catalyst is normally carried out, so a determination can be made that said electrically heated catalyst is normal. Here, note that even if the air fuel ratio of the exhaust gas is controlled so as to become a rich air fuel ratio at the time of starting of the internal combustion engine, the exhaust gas at the time of the last operation of the internal combustion engine remains in the exhaust passage, before the starting of the internal combustion engine. For this reason, at the time of starting of the internal combustion engine, a gas containing a large amount of oxygen passes through the electrically heated catalyst. At this time, the oxygen is stored in the catalyst.

In addition, in the present invention, said determination device can make a determination that electrical energization to said electrically heated catalyst is carried out normally, in cases where a period of time after said internal combustion engine is started until the oxygen concentration detected by said downstream side detection device changes to a value indicating a rich air fuel ratio is longer than a predetermined period of time; and said determination device can make a determination that electrical energization to said electrically heated catalyst is not carried out normally, in cases where said period of time is equal to or less than the predetermined period of time.

In other words, if the electrically heated catalyst is normal, oxygen will be released from the catalyst when an exhaust gas of a rich air fuel ratio passes through the electrically heated catalyst, and so, the period of time in which the air fuel ratio at the downstream side of the electrically heated catalyst (hereinafter referred to as the downstream side air fuel ratio) substantially becomes the stoichiometric air fuel ratio is relatively long. On the other hand, if the temperature of the electrically heated catalyst does not go up, oxygen is not released even if the exhaust gas of a rich air fuel ratio passes through the electrically heated catalyst, and hence, the downstream side air fuel ratio becomes the same rich air fuel ratio as an air fuel ratio at the upstream side of the electrically heated catalyst. In addition, in cases where an amount of rise of the temperature of the catalyst is not enough, the amount of oxygen stored therein accordingly decreases, so that when the exhaust gas of a rich air fuel ratio passes through the catalyst, a period of time in which the air fuel ratio at the downstream side is substantially the stoichiometric air fuel ratio becomes short. Thus, a period of time after the internal combustion engine is started until the air fuel ratio at the downstream side of the catalyst becomes a rich air fuel ratio is in correlation with the temperature of the catalyst. Based on this period of time, it is possible to determine whether the temperature of the catalyst goes up, thus making it possible to detect the failure of the electrically heated catalyst. Here, note that the predetermined period of time can be set as a threshold value at the time when the electrically heated catalyst is on the boundary between the time it is in failure and the time it is normal.

Moreover, in the present invention, provision can be made for an upstream side detection device that is arranged at the upstream side of said electrically heated catalyst and detects a concentration of oxygen in the exhaust gas;

wherein said determination device can make a determination that electrical energization to said electrically heated catalyst is carried out normally, in cases where a period of time after said internal combustion engine is started until the oxygen concentrations detected by said upstream side detection device and said downstream side detection device both change to values indicating rich air fuel ratios, respectively, is longer than a predetermined period of time; and wherein said determination device can make a determination that electrical energization to said electrically heated catalyst is not carried out normally, in cases where said period of time is equal to or less than the predetermined period of time.

In other words, if the electrically heated catalyst is normal, oxygen will be released from the catalyst when the exhaust gas of a rich air fuel ratio passes through the electrically heated catalyst, and hence, a period of time, in which the air fuel ratio of the exhaust gas at the upstream side of the electrically heated catalyst becomes a rich air fuel ratio and in which the air fuel ratio at the downstream side of the electrically heated catalyst substantially becomes the stoichiometric air fuel ratio, is relatively long. On the other hand, if the temperature of the electrically heated catalyst does not go up, oxygen is not released even if the exhaust gas of a rich air fuel ratio passes through the electrically heated catalyst, and hence, the upstream side air fuel ratio and the downstream side air fuel ratio become rich air fuel ratios, respectively. In addition, in cases where an amount of rise of the temperature of the catalyst is not enough, the amount of oxygen stored therein accordingly decreases, so that when the exhaust gas of a rich air fuel ratio passes through the catalyst, a period of time in which the air fuel ratio at the downstream side is substantially the stoichiometric air fuel ratio becomes short. Thus, the period of time after the internal combustion engine is started until the oxygen concentrations detected by the upstream side detection device and the downstream side detection device both change to values indicating rich air fuel ratios, respectively, is in correlation with the temperature of the catalyst. That is, based on this period of time, it is possible to determine whether the temperature of the catalyst goes up, thus making it possible to detect the failure of the electrically heated catalyst. In addition, the predetermined period of time can be set as a threshold value at the time when the electrically heated catalyst is on the boundary between the time it is in failure and the time it is normal.

Here, note that a determination as to whether the electrically heated catalyst is normal may be carried out based on a period of time after the oxygen concentration detected by the upstream side detection device becomes a value indicating a rich air fuel ratio until the oxygen concentration detected by the downstream side detection device becomes a value indicating a rich air fuel ratio is longer than a predetermined period of time. That is, a period of time after the air fuel ratio of the exhaust gas flowing into the electrically heated catalyst becomes a rich air fuel ratio, until the air fuel ratio of the exhaust gas flowing out of the electrically heated catalyst becomes a rich air fuel ratio changes according to the temperature of the catalyst, and hence, it is possible to perform the failure detection of the electrically heated catalyst by the use of this period of time, too.

Further, in the present invention, said electrically heated catalyst can be electrically energized from before the starting of said internal combustion engine.

In that case, if the electrically heated catalyst is normal, at the time when the internal combustion engine is started, the temperature of the electrically heated catalyst will be high, so the occlusion or storage of oxygen will be carried out immediately. For this reason, a period of time required for failure detection can be shortened, and at the same time, the accuracy of the detection can be enhanced.

In addition, in the present invention, further provision can be made for:

a resistance detection device that detects an electric resistance of said electrically heated catalyst when said electrically heated catalyst is electrically energized; and an estimation device that estimates a temperature of said electrically heated catalyst based on the electric resistance detected by said resistance detection device;

wherein said determination device can determine whether or not said electrically heated catalyst is electrically energized, when the temperature of said electrically heated catalyst estimated by said estimation device is higher than a predetermined value.

Here, there is a correlation between the electric resistance and the temperature of the electrically heated catalyst, so the temperature can be estimated based on the electric resistance. However, the temperature estimated in this manner is low in accuracy, and hence, when the failure detection of the electrically heated catalyst is carried out based on this temperature, the accuracy of detection will become low. But, an approximate temperature can be estimated. Here, if the temperature of the electrically heated catalyst is made high to a sufficient extent by electrical energization thereof, there will be no need for electrical energization, so electrical energization may be stopped. After electrical energization is stopped in this manner, the temperature of the electrically heated catalyst falls in a gradual manner. Then, when a period of time until the internal combustion engine is started becomes long, it becomes impossible to maintain the activity of the catalyst due to the fall of its temperature. In such a case, if failure detection based on the amount of stored oxygen is carried out after starting of the internal combustion engine, a determination can not be made as to whether the amount of stored oxygen is small because electrical energization has not been carried out, or the amount of stored oxygen is small because electrical energization was carried out but the temperature has fallen after that. In addition, there may be a case where the temperature rise of the electrically heated catalyst takes time, and the temperature of the electrically heated catalyst can not be raised to a sufficient extent until the starting of the internal combustion engine. In this case, too, it becomes difficult to detect the failure of the electrically heated catalyst.

Accordingly, a condition that the temperature estimated by the estimation device is higher than a predetermined value is used as a prerequisite for the failure detection of the electrically heated catalyst. That is, failure detection is carried out only when the temperature thus estimated is higher than the predetermined value. Here, note that the predetermined value may be an upper limit value of the temperature at which the catalyst has not been activated. When the temperature of the catalyst exceeds this upper limit value, the catalyst is estimated to have been activated. Then, by determining based on the estimated temperature whether or not failure detection is carried out, detection accuracy can be further enhanced.

Moreover, in the present invention, further provision can be made for:

a resistance detection device that detects an electric resistance of said electrically heated catalyst when said electrically heated catalyst is electrically energized; and an estimation device that estimates a temperature of said electrically heated catalyst based on the electric resistance detected by said resistance detection device;

wherein said determination device can make a determination that said electrically heated catalyst is electrically energized, only in cases where the temperature of said electrically heated catalyst estimated by said estimation device is higher than a predetermined value.

In this case, even if the temperature of the electrically heated catalyst thus estimated is equal to or lower than the predetermined value, it is determined whether or not the electrically heated catalyst is electrically energized. Then, the condition that the estimated temperature is higher than the predetermined value is used as one of the conditions under which a determination is made that the electrically heated catalyst is electrically energized. Accordingly, even in cases where based on the time when the oxygen concentration detected by the downstream side detection device changes to a value indicating a rich air fuel ratio, it can be considered that the electrically heated catalyst is electrically energized, a determination is not made that the electrically heated catalyst is normal, in cases where the estimated temperature is equal to or less than the predetermined value. Thus, detection accuracy can be further enhanced by carrying out failure detection based on the estimated temperature and the oxygen concentration at the downstream side of the electrically heated catalyst.

Effect of the Invention

According to the present invention, it is possible to detect whether or not an electrically heated catalyst is normal, by accurately detecting whether the temperature of the electrically heated catalyst has gone up.

MODES FOR CARRYING OUT THE INVENTION

Hereinafter, reference will be made to specific embodiments of a failure detection apparatus for an electrically heated catalyst according to the present invention based on the attached drawings. Here, note that the following embodiments can be combined as long as feasible.

First Embodiment

Figure 1:
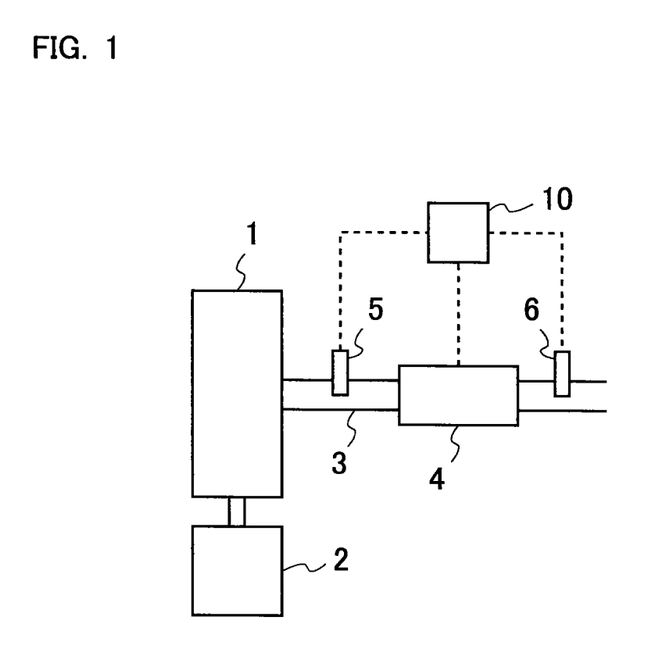
FIG. 1 is a view showing the schematic construction of an internal combustion engine and an electrically heated catalyst according to embodiments of the present invention.

FIG. 1 is a view showing the schematic construction of an internal combustion engine and an electrically heated catalyst according to this first embodiment of the present invention. The internal combustion engine 1 is mounted on a vehicle, and may be a diesel engine, or may be a gasoline engine. In addition, in this embodiment, a hybrid system may also be adopted which is provided with an electric motor 2. By means of this electric motor 2, a crankshaft of the internal combustion engine 1 can be caused to rotate, or the vehicle can be driven.

An exhaust passage 3 is connected to the internal combustion engine 1. An electrically heated catalyst 4 is arranged in the middle of the exhaust passage 3. An air fuel ratio sensor 5 for measuring an air fuel ratio of an exhaust gas flowing through the exhaust passage 3 is mounted on a portion of the exhaust passage 3 at the upstream side of the electrically heated catalyst 4. In addition, an oxygen sensor 6 for measuring an oxygen concentration of the exhaust gas flowing through the exhaust passage 3 is mounted on a portion of the exhaust passage 3 at the downstream side of the electrically heated catalyst 4. The air fuel ratio sensor 5 is a sensor that outputs a signal corresponding to the air fuel ratio of the exhaust gas. That is, according to the air fuel ratio sensor 5, the value of the air fuel ratio can be detected. In addition, an output signal of the oxygen sensor 6 changes suddenly at the boundary of the stoichiometric air fuel ratio. For this reason, according to the oxygen sensor 6, it is possible to detect whether the air fuel ratio of the exhaust gas is at the rich side or at the lean side of the stoichiometric air fuel ratio. Here, note that in this embodiment, the air fuel ratio sensor 5 corresponds to an upstream side detection device in the present invention. Also, in this embodiment, the oxygen sensor 6 corresponds to a downstream side detection device in the present invention.

The electrically heated catalyst 4 according to this embodiment is constructed to be provided with a heat generation element and a catalyst. A material, which is electrically energized to generate heat, is used for the heat generation element. SiC can be used for the material of the heat generation element, for example. Two pieces of electrodes are connected to the heat generation element, so that the heat generation element is energized by applying a voltage between these electrodes. The heat generation element generates heat due to the electric resistance of this heat generation element.

The catalyst is carried or supported by this heat generation element, or the catalyst is arranged at the downstream side of the heat generation element. The catalyst should be arranged in a range in which it can receive heat from the heat generation element. As the catalyst, there can be mentioned an oxidation catalyst, a three-way catalyst, an NOx storage reduction catalyst, an NOx selective reduction catalyst, etc., for example. These catalysts are provided with the capability to store oxygen.

In addition, in the internal combustion engine 1, there is arranged in combination therewith an ECU 10 which is an electronic control unit for controlling the internal combustion engine 1. This ECU 10 is provided with a CPU, a ROM and a RAM which store a variety of kinds of programs and maps, and so on, and it is a unit that controls the internal combustion engine 1 in accordance with the operating conditions of the internal combustion engine 1 and/or driver's requirements.

The air fuel ratio sensor 5 and the oxygen sensor 6 are connected to the ECU 10 through electrical wiring, so that the output signals of these sensors are inputted to the ECU 10. In addition, the electrically heated catalyst 4 is connected to the ECU 10 through electrical wiring, so that the ECU 10 controls the supply of current (electrical energization) to the electrically heated catalyst 4.

Then, the ECU 10 carries out failure detection of the electrically heated catalyst 4. In this failure detection, when electrical energization to the electrically heated catalyst 4 is not carried out normally, a determination is made that the electrically heated catalyst 4 is in failure. In this embodiment, the determination is carried out based on an amount of oxygen stored in the catalyst.

Here, when the catalyst is activated, oxygen in the exhaust gas will be stored in the catalyst. Accordingly, if the electrically heated catalyst 4 is normal, the catalyst will be activated by the electrical energization thereof so that oxygen will be stored. On the other hand, if the electrically heated catalyst 4 is in failure and the temperature of the catalyst does not go up, the catalyst is not activated, and hence oxygen is not stored therein. In this manner, a difference occurs in the amount of oxygen stored in the catalyst between the case where the electrically heated catalyst 4 is in failure and the case where the electrically heated catalyst 4 is normal. Thus, by detecting this difference, it is possible to carry out failure detection of the electrically heated catalyst 4.

First, electric power is supplied to the electrically heated catalyst 4 so that the catalyst is activated, before starting of the internal combustion engine 1. After that, the internal combustion engine 1 is driven to start. At this time, an amount of fuel to be injected or an amount of intake air is adjusted so that the internal combustion engine 1 is operated at a rich air fuel ratio. Then, when a period of time after the internal combustion engine 1 is started until the output value of the oxygen sensor 6 comes to indicate a rich air fuel ratio is longer than a predetermined period of time, a determination is made that the electrically heated catalyst 4 is normal, whereas when this period of time is equal to or less than the predetermined period of time, a determination is made that the electrically heated catalyst 4 is in failure. This predetermined period of time can be obtained through experiments, etc. Here, note that in this embodiment, the ECU 10, which causes the internal combustion engine 1 to operate at a rich air fuel ratio by adjusting the amount of fuel injection or the amount of intake air at the time of starting of the internal combustion engine 1, corresponds to an air fuel ratio control device in the present invention.

That is, if the catalyst is activated, oxygen is released from the catalyst when the air fuel ratio of the exhaust gas flowing into the electrically heated catalyst 4 is a rich air fuel ratio. With this oxygen, the air fuel ratio of the exhaust gas becomes substantially the stoichiometric air fuel ratio. That is, at the downstream side of the electrically heated catalyst 4, the air fuel ratio of the exhaust gas becomes the stoichiometric air fuel ratio. Then, during the time when oxygen is released from the catalyst, the output value of the oxygen sensor 6 does not indicate a rich air fuel ratio. Thereafter, when the release of the oxygen stored in the catalyst ends, the output value of the oxygen sensor 6 will come to indicate a rich air fuel ratio. Thus, if the electrically heated catalyst 4 is normal, a certain period of time will be required before the output value of the oxygen sensor 6 comes to indicate a rich air fuel ratio after the internal combustion engine 1 is started.

On the other hand, if the catalyst is not activated, almost no oxygen is released from the catalyst even when the air fuel ratio of the exhaust gas flowing into the electrically heated catalyst 4 is a rich air fuel ratio. For this reason, the air fuel ratio of the exhaust gas at the downstream side of the electrically heated catalyst 4 becomes a rich air fuel ratio. Accordingly, the output value of the oxygen sensor 6 will come to indicate a rich air fuel ratio immediately after starting of the internal combustion engine 1. Thus, if the electrically heated catalyst 4 is in failure, no much time will be taken before the output value of the oxygen sensor 6 comes to indicate a rich air fuel ratio after the internal combustion engine 1 is started.

As described above, a determination as to whether electrical energization to the electrically heated catalyst 4 is normally carried out can be made based on the period of time from starting of the internal combustion engine 1 until the output value of the oxygen sensor 6 indicates a rich air fuel ratio. That is, it is possible to carry out failure detection of the electrically heated catalyst 4.

Figure 2:
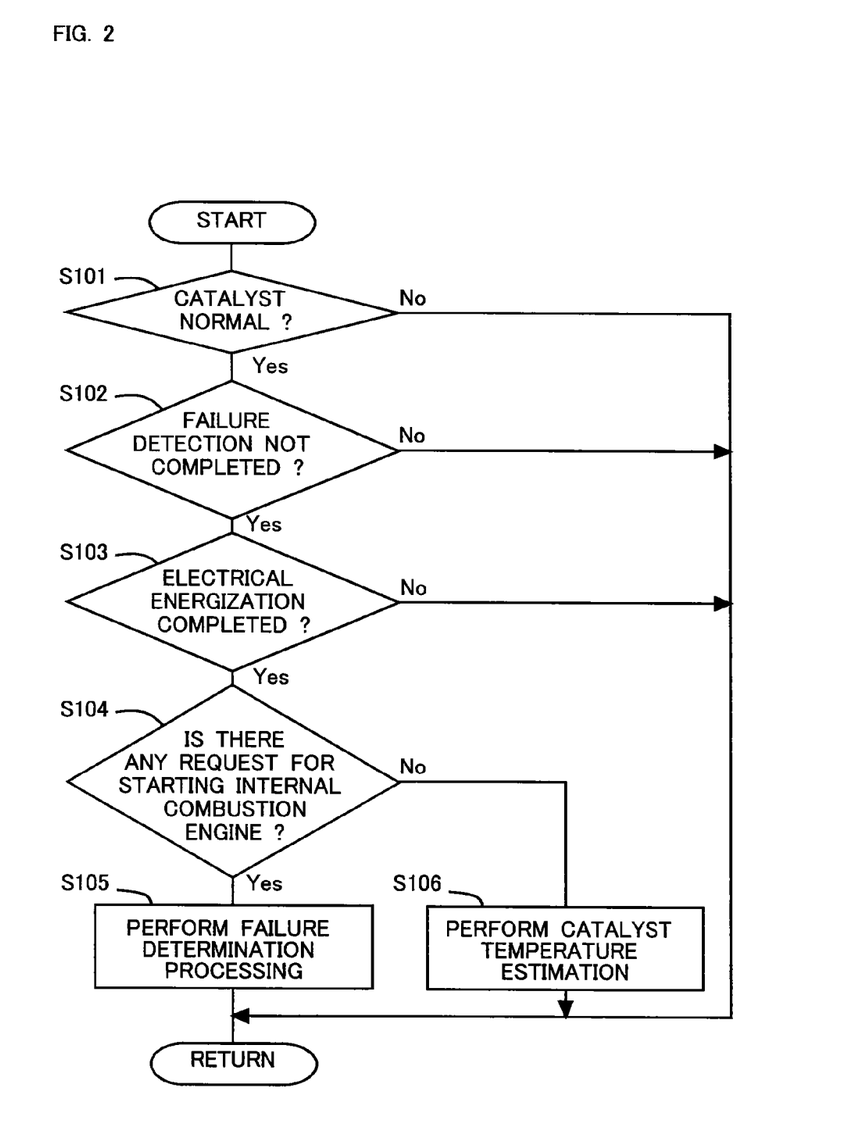
FIG. 2 is a flow chart showing a failure determination flow for an electrically heated catalyst according to a first embodiment of the present invention.

FIG. 2 is a flow chart showing a failure determination flow for the electrically heated catalyst 4 according to this embodiment of the present invention. This routine is carried out by means of the ECU 10 at each predetermined time interval.

In step S101, it is determined whether the catalyst is normal. That is, when the catalyst has deteriorated, an oxygen storage capacity thereof will be low, so that it will become difficult to make a determination as to whether electrical energization to the electrically heated catalyst 4 is carried out normally. For this reason, in this step, it is determined whether the catalyst has the capacity or capability to store oxygen therein. Whether the catalyst is normal was determined at the time of the last operation of the internal combustion engine 1, and this result has been stored in the ECU 10. Here, note that well-known techniques can be used for the determination of whether the catalyst is normal. In cases where an affirmative determination is made in step S101, the routine advances to step S102, whereas in cases where a negative determination is made, there is a possibility that the failure detection of the electrically heated catalyst 4 can not be made in an accurate manner, and hence, this routine is ended.

In step S102, it is determined whether the failure detection of the electrically heated catalyst 4 has not been completed. In cases where an affirmative determination is made in step S102, the routine advances to step S103, whereas in cases where a negative determination is made, there is no need to carry out the failure detection of the electrically heated catalyst 4, and hence, this routine is ended.

In step S103, it is determined whether the electrical energization to the electrically heated catalyst 4 has been completed. In this step, when the electrically heated catalyst 4 is normal, it is determined whether electric power enough to activate the catalyst has been supplied. For example, electrical energization is completed or finished when a predetermined period of time has elapsed from the start of the electrical energization. In addition, when a predetermined amount of electric power has been supplied, the electrical energization may also be completed or finished. Moreover, the temperature of the electrically heated catalyst 4 may be estimated, for example, from the electric resistance thereof, and when that temperature reaches a predetermined temperature, the electrical energization may be completed. This estimation of the temperature will be described later. In cases where an affirmative determination is made in step S103, the routine advances to step S104, whereas in cases where a negative determination is made, it is not in a state where the failure detection of the electrically heated catalyst 4 can not be carried out, and hence, this routine is ended.

In step S104, it is determined whether there is a request for starting the internal combustion engine 1. For example, with a hybrid vehicle, in cases where a predetermined speed has been reached, the internal combustion engine 1 is started. That is, in such a case, a determination is made that there is a request for starting the internal combustion engine 1. In addition, in the case of a vehicle which is driven to run by means of the internal combustion engine 1 alone, when a switch for starting the internal combustion engine 1 is turned on, for example, a determination is made that there is a request for starting the internal combustion engine 1. In cases where an affirmative determination is made in step S104, the routine advances to step S105, whereas in cases where a negative determination is made, the routine advances to step S106.

In step S105, failure determination processing of the electrically heated catalyst 4 is carried out. This determination will be described later. Here, note that in this embodiment, the ECU 10, which carries out the processing of step S105, corresponds to a determination device in the present invention.

In step S106, the temperature of the electrically heated catalyst 4 is estimated. The temperature of the electrically heated catalyst 4 is estimated until a request for starting the internal combustion engine 1 is made. This estimation is carried out based on the electric resistance of the electrically heated catalyst 4 at the time when electric power is supplied to the electrically heated catalyst 4, for example. Here, note that at this time, electric power is not supplied to the electrically heated catalyst 4, so in order to detect the electric resistance of the electrically heated catalyst 4, electric power is supplied to the electrically heated catalyst 4.

Figure 3:
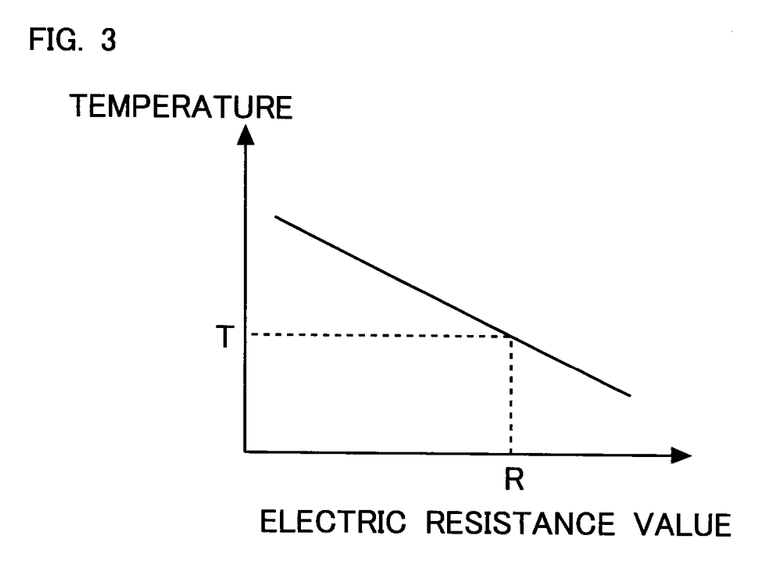
FIG. 3 is a view showing the relation between the electric resistance and the temperature of the electrically heated catalyst when it is electrically energized.

FIG. 3 is a view showing the relation between the electric resistance and the temperature of the electrically heated catalyst 4 when it is electrically energized. Thus, there is a correlation in the electric resistance and the temperature of the electrically heated catalyst 4, and so, the lower the temperature of the electrically heated catalyst 4, the larger becomes the electric resistance of the electrically heated catalyst 4. If this relation has been obtained through experiments, etc., in advance and stored in the ECU 10, the temperature T of the electrically heated catalyst 4 can be estimated based on the electric resistance R thereof at the time when the electrically heated catalyst 4 is electrically energized. However, this relation between the temperature and the electric resistance may change according to the individual difference and aging of the electrically heated catalyst 4. In that case, there may occur a deviation between the relation stored in the ECU 10 and the actual relation. That is, even if the temperature of the electrically heated catalyst 4 is estimated based on the electric resistance of the electrically heated catalyst 4, the accuracy of the estimation is low, and so, failure detection of the electrically heated catalyst 4 is not carried out based on the temperature estimated. This estimated temperature is used for determining whether a prerequisite or precondition for carrying out the failure detection of the electrically heated catalyst 4 is satisfied.

Figure 4:
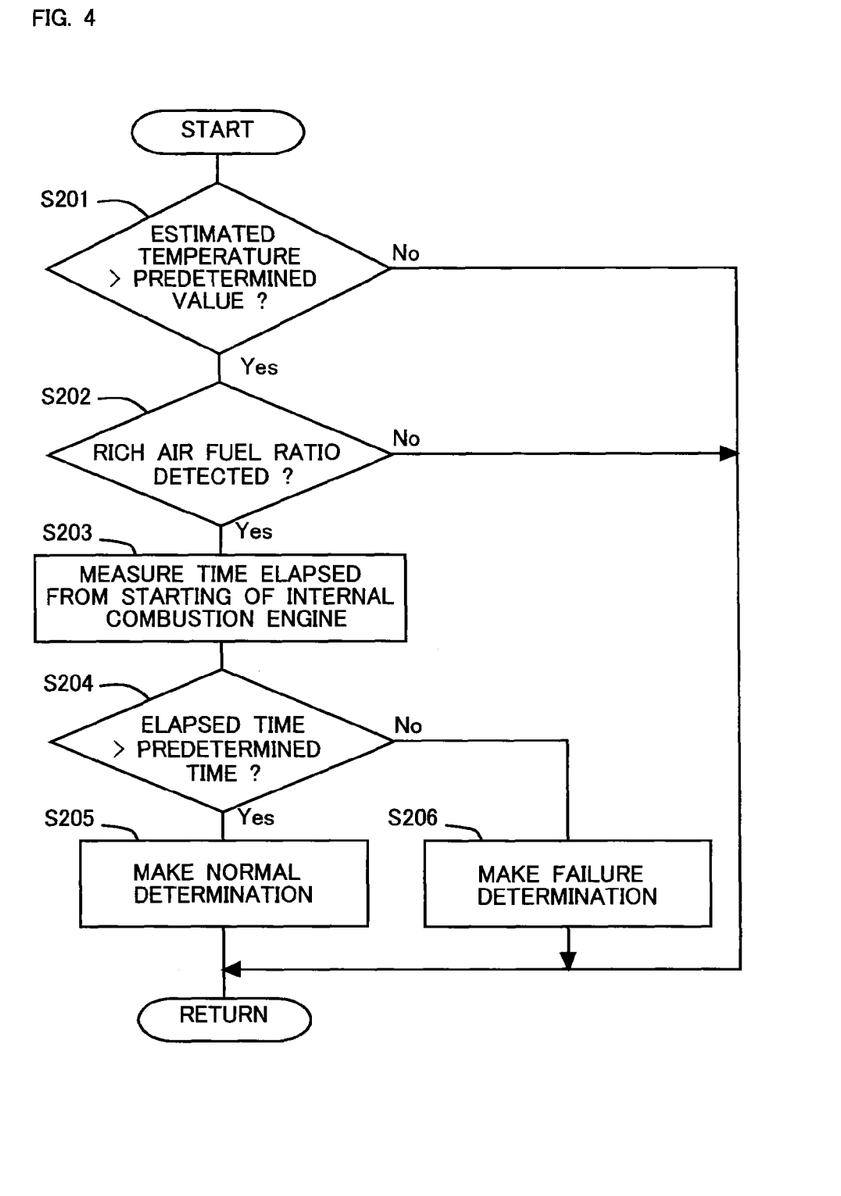
FIG. 4 is a flow chart showing a flow of failure determination processing using an oxygen sensor according to the first embodiment of the present invention.

Next, FIG. 4 is a flow chart showing a flow of failure determination processing using the oxygen sensor 6 according to the first embodiment of the present invention. This routine is carried out in the above-mentioned step S105.

In step S201, it is determined whether the temperature of the electrically heated catalyst 4 estimated in step S106 is higher than a predetermined value. The predetermined value referred to herein is an upper limit value of the temperature at which the catalyst 3 has not been activated. That is, when the temperature of the catalyst exceeds this upper limit value, the catalyst is assumed to have been activated. Because the determination is made in step S103 that the electrical energization has been completed, at the time when this step S201 is processed, the electrical energization to the electrically heated catalyst 4 is not carried out. In that case, the temperature of the catalyst goes down gradually, so there is a fear that the temperature of the catalyst may become lower than its activation temperature. For this reason, in this step, it is determined whether the catalyst has been activated. When the temperature of the catalyst is low, it is difficult to perform the failure detection thereof based on an amount of oxygen stored therein, so the failure detection is not carried out. Here, note that the temperature estimated here is low in accuracy, and is not used for failure detection, but is instead used for the determination of whether the prerequisite for carrying out failure detection is satisfied. In cases where an affirmative determination is made in step S201, the routine advances to step S202, whereas in cases where a negative determination is made, the failure detection of the electrically heated catalyst 4 can not be carried out, and hence, this routine is ended.

In step S202, it is determined whether a rich air fuel ratio has been detected by the oxygen sensor 6. That is, it is determined whether the output value of the oxygen sensor 6 indicates a rich air fuel ratio. In cases where an affirmative determination is made in step S202, the routine advances to step S203, whereas in cases where a negative determination is made, oxygen is being released from the catalyst, and hence, this routine is ended.

In step S203, a period of time after the internal combustion engine 1 is started until the output value of the oxygen sensor 6 indicates a rich air fuel ratio is measured. This period of time is counted by a timer built in the ECU 10.

In step S204, it is determined whether the period of time after the internal combustion engine 1 is started until the output value of the oxygen sensor 6 indicates a rich air fuel ratio is longer than a predetermined period of time. The predetermined period of time referred to herein is an upper limit value of the period of time after the internal combustion engine 1 is started until the output value of the oxygen sensor 6 indicates a rich air fuel ratio, when the electrically heated catalyst 4 is in failure. That is, if the electrically heated catalyst 4 is normal, the period of time required until the output value of the oxygen sensor 6 comes to indicate a rich air fuel ratio becomes long.

Then, in cases where an affirmative determination is made in step S204, the catalyst has been activated, so the routine advances to step S205, in which a determination is made that the electrically heated catalyst 4 is normal. On the other hand, in cases where a negative determination is made in step S204, the catalyst has not been activated, so the routine advances to step S206, in which a determination is made that the electrically heated catalyst 4 is in failure.

As explained above, in this embodiment, it is determined based on the output value of the oxygen sensor 6 whether the catalyst has been activated. As a result of this, it is possible to determine whether or not the temperature of the electrically heated catalyst 4 has gone up, and hence, it is possible to determine whether or not the electrically heated catalyst 4 is normal. In addition, at the time of starting of the internal combustion engine 1, it is difficult for the temperature of the electrically heated catalyst 4 to change, so the accuracy of failure detection thereof can be enhanced by carrying out the failure detection at this time.

Here, note that in this embodiment, the electrically heated catalyst 4 has been electrically energized from before starting of the internal combustion engine 1, but instead of this, electrical energization to the electrically heated catalyst 4 may be started after starting of the internal combustion engine 1, or simultaneously with the starting thereof. Here, note that a certain period of time will be taken until the catalyst is activated after electric power is supplied to the electrically heated catalyst 4, and hence, if the electrically heated catalyst 4 is electrically energized from before the starting of the internal combustion engine 1, purification of the exhaust gas will be able to be attained at an early period of time. In addition, with a hybrid vehicle, it is possible to run the vehicle only by the electric motor 2, without causing the internal combustion engine 1 to operate, as a result of which even at the time of electrically energizing the electrically heated catalyst 4 before the starting of the internal combustion engine 1, the vehicle can be driven to run by means of the electric motor 2.

In addition, although a certain period of time will also be taken until the catalyst provided on the oxygen sensor 6 is activated, the concentration of oxygen in the exhaust gas can be measured at an early period of time, by heating the oxygen sensor 6 from before the starting of the internal combustion engine 1, similar to the electrically heated catalyst 4.

Moreover, in this embodiment, the oxygen sensor 6 is arranged at the downstream side of the electrically heated catalyst 4, but an air fuel ratio sensor may be provided in place of this. That is, there may be provided the air fuel ratio sensor which serves to output a signal corresponding to an air fuel ratio, and failure detection may be carried out based on a period of time from the starting of the internal combustion engine 1 until a rich air fuel ratio is detected by the air fuel ratio sensor.

Second Embodiment

This second embodiment is different from the first embodiment in the processing carried out in the above-mentioned step S105. The other devices, parts and so on are the same as those in the first embodiment, so the explanation thereof is omitted. Here, note that in this second embodiment, failure detection of the electrically heated catalyst 4 is carried out by the use of the output values of the air fuel ratio sensor 5 and the oxygen sensor 6.

Figure 5:
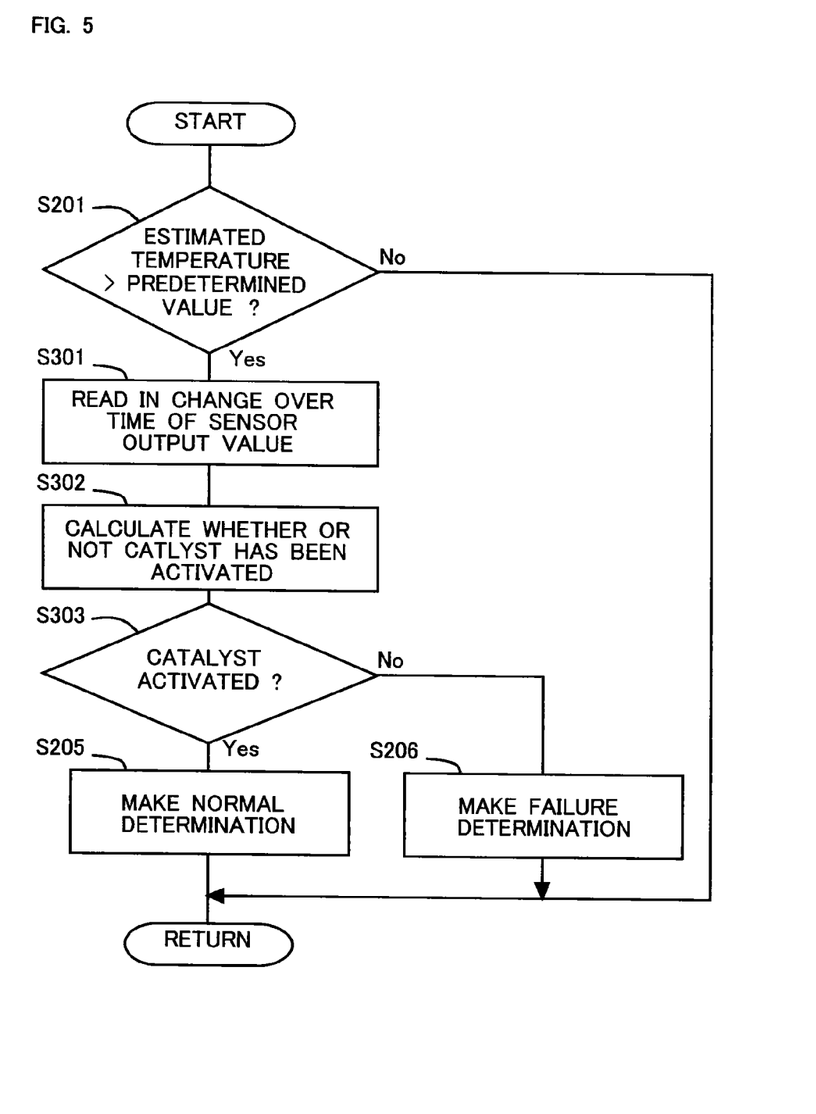
FIG. 5 is a flow chart showing a flow of failure determination processing using an air fuel ratio sensor and an oxygen sensor according to a second embodiment of the present invention.

Here, FIG. 5 is a flow chart showing a flow of failure determination processing using the air fuel ratio sensor 5 and the oxygen sensor 6 according to the second embodiment of the present invention. This routine is carried out in the above-mentioned step S105. Here, note that for those steps in which the same processing as in the flow chart shown in the first embodiment is carried out, the same symbols are attached and an explanation thereof is omitted.

In step S301, the changes over time of the output values of the air fuel ratio sensor 5 and the oxygen sensor 6 are read. That is, the output values of the air fuel ratio sensor 5 and the oxygen sensor 6 have been stored in the ECU 10, and the changes over time of the output values are obtained.

In step S302, it is calculated whether the catalyst has been activated. In this embodiment, whether the catalyst has been activated is calculated based on the changes over time of the output values of the air fuel ratio sensor 5 and the oxygen sensor 6. Here, the output value of the air fuel ratio sensor 5 is not affected by the influence from the electrically heated catalyst 4. In addition, the air fuel ratio detected by the air fuel ratio sensor 5 is the air fuel ratio of the exhaust gas before flowing into the electrically heated catalyst 4. Accordingly, the output value of the air fuel ratio sensor 5 comes to indicate a rich air fuel ratio immediately after the starting of the internal combustion engine 1, and thereafter, also changes at the rich air fuel ratio.

On the other hand, the output value of the oxygen sensor 6 is affected by the influence from the electrically heated catalyst 4, as explained in the first embodiment. For this reason, the change over time of the output value of the oxygen sensor 6 will be different depending upon whether the catalyst has been activated. Then, if the catalyst has been activated at the time of starting of the internal combustion engine 1, a period of time after the internal combustion engine 1 is started until rich air fuel ratios are detected by means of both the air fuel ratio sensor 5 and the oxygen sensor 6 will become long. Accordingly, when this period of time is longer than a predetermined period of time, a determination is made that the catalyst has been activated. The predetermined period of time referred to herein is an upper limit value of the period of time after the internal combustion engine 1 is started until the output values of the air fuel ratio sensor 5 and the oxygen sensor 6 indicate rich air fuel ratios, when the electrically heated catalyst 4 is in failure.

In addition, by making a comparison between the change over time of the output value of the air fuel ratio sensor 5 and the change over time of the output value of the oxygen sensor 6, it is also possible to determine whether the catalyst has been activated. That is, if the catalyst has been activated at the time of starting of the internal combustion engine 1, a period of time after the output value of the air fuel ratio sensor 5 becomes a rich air fuel ratio until the output value of the oxygen sensor 6 becomes a rich air fuel ratio will be long. Accordingly, this period of time is measured, and if it is longer than a predetermined period of time, for example, it is assumed that the catalyst has been activated.

In step S303, it is determined whether a calculation has been made in step S302 that the catalyst has been activated. Then, in cases where an affirmative determination is made in step S303, the routine advances to step S205, in which a determination is made that the electrically heated catalyst 4 is normal, as the catalyst has been activated. On the other hand, in cases where a negative determination is made, the routine advances to step S206, in which a determination is made that the electrically heated catalyst 4 is in failure, as the catalyst has not been activated.

As described above, according to this embodiment, by determining, based on the output values of the air fuel ratio sensor 5 and the oxygen sensor 6, whether the catalyst has been activated, it is possible to determine whether or not the temperature of the electrically heated catalyst 4 has gone up, and hence, it is possible to determine whether or not the electrically heated catalyst 4 is normal.

Third Embodiment

In this third embodiment, failure detection is carried out by additionally using the temperature of the electrically heated catalyst 4 estimated based on the electric resistance of the electrically heated catalyst 4. That is, failure detection is carried out based on a period of time until the output value of the oxygen sensor 6 changes to a value which indicates a rich air fuel ratio, and the temperature estimated based on the electric resistance. Thus, the accuracy of failure detection can be enhanced by detecting whether the temperature of the electrically heated catalyst 4 has gone up, by means of two different techniques, respectively, and making a comparison between the results of detection.

In addition, in this embodiment, after electric power is supplied to the electrically heated catalyst 4, even in cases where there is no request for starting the internal combustion engine 1, the internal combustion engine 1 is started and failure detection of the electrically heated catalyst 4 is carried out. Thus, the accuracy of failure detection can be enhanced by starting the internal combustion engine 1 in a positive manner, when the electrically heated catalyst 4 is stable at high temperature.

Moreover, in this embodiment, before starting the internal combustion engine 1 by supplying fuel thereto, the crankshaft of the internal combustion engine 1 is driven to rotate by means of the electric motor 2, while supplying electric power to the electrically heated catalyst 4. As a result of this, air is caused to discharge from the internal combustion engine 1, so that air is sent to the electrically heated catalyst 4. In that case, a sufficient amount of oxygen can have been stored in the catalyst in advance, so the accuracy of failure detection can be enhanced. In addition, a period of time required for the failure detection can be shortened.

Further, in this embodiment, at the time of starting of the internal combustion engine 1, the internal combustion engine 1 is controlled in such a manner as to achieve the suppression of the electrically heated catalyst 4 being cooled by the exhaust gas, the suppression of discharge of unburnt fuel, and the completion of the failure detection in a short time. Here, at the time of starting of the internal combustion engine 1, an exhaust gas of low temperature flows into the electrically heated catalyst 4. Thus, if the electrically heated catalyst 4 is suppressed from being cooled by this exhaust gas, the purification rate of the exhaust gas can be maintained as remaining high. In addition, if the discharge of unburnt fuel is suppressed, it will be possible to suppress the unburnt fuel from being released into atmospheric air. Moreover, if failure detection can be caused to complete in a short time, it will be made difficult to be affected by the influence of the operating state of the internal combustion engine 1, thus making it possible to improve the accuracy of the failure detection. Then, for example, the internal combustion engine 1 is controlled in such a manner that ignition timing can be at an advanced side from top dead center, and the air fuel ratio can be at a richer side than the stoichiometric air fuel ratio. As a result of this, the combustion state can be made stable and the temperature of combustion gas can be made high, so it is possible to achieve the suppression of the electrically heated catalyst 4 being cooled by the exhaust gas, the suppression of discharge of unburnt fuel, and the completion of failure detection in a short time.

Figure 6:
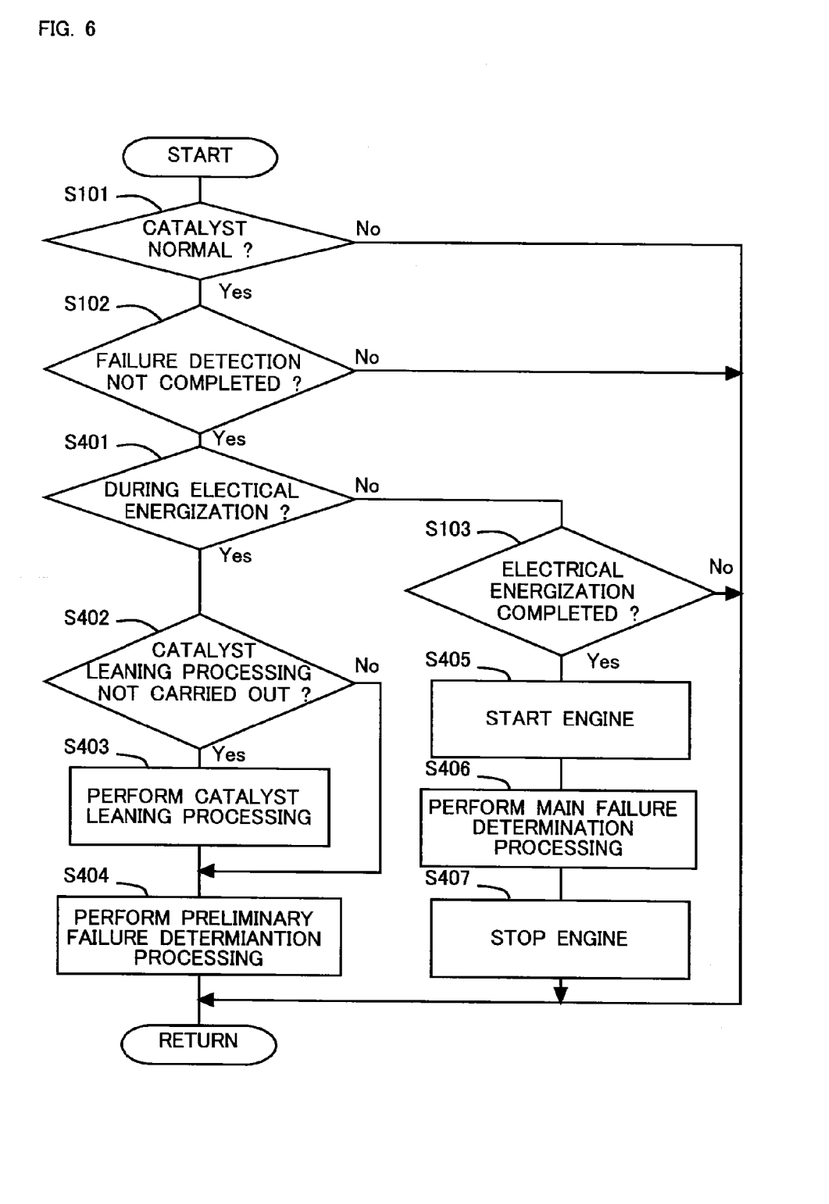
FIG. 6 is a flow chart showing a tentative or preliminary failure determination flow for an electrically heated catalyst according to a third embodiment of the present invention.

The other devices, parts and so on are the same as those in the first embodiment, so the explanation thereof is omitted. FIG. 6 is a flow chart showing a tentative or preliminary failure determination flow for the electrically heated catalyst 4 according to this embodiment of the present invention. Here, note that for those steps in which the same processing as in the flow charts shown in the above-mentioned embodiments is carried out, the same symbols are attached and an explanation thereof is omitted.

In step S401, it is determined whether electrical energization to the electrically heated catalyst 4 is being carried out. That is, it is determined whether the temperature of the electrically heated catalyst 4 is in the course of being raised. In cases where an affirmative determination is made in step S401, the routine advances to step S402, whereas in cases where a negative determination is made, the routine advances to step S103.

In step S402, it is determined whether catalyst leaning processing is not carried out. The catalyst leaning processing is processing which sends air to the electrically heated catalyst 4, before starting the internal combustion engine 1 by supplying fuel thereto. In the catalyst leaning processing, in order to send air to the electrically heated catalyst 4, the supply of fuel to the internal combustion engine 1 is not carried out, and the crankshaft of the internal combustion engine 1 is driven to rotate by means of the electric motor 2. That is, air is caused to discharge from the internal combustion engine 1. At this time, the electrically heated catalyst 4 is electrically energized. As a result of this, oxygen is stored in the electrically heated catalyst 4 in accordance with the rising temperature of the electrically heated catalyst 4. That is, oxygen can have been caused to be stored in the catalyst before starting of the internal combustion engine 1.

In cases where an affirmative determination is made in step S402, the routine advances to step S403. On the other hand, in cases where a negative determination is made, the routine advances to step S404.

In step S403, catalyst leaning processing is carried out. The catalyst leaning processing is carried out until the temperature of the electrically heated catalyst 4 becomes higher than the above-mentioned predetermined value.

In step S404, preliminary failure determination processing is carried out. The preliminary failure determination processing is processing which determines from an estimated value of the temperature of the electrically heated catalyst 4 whether the electrically heated catalyst 4 is normal. The temperature of the electrically heated catalyst 4 is estimated based on the electric resistance of the electrically heated catalyst 4 at the time when the electrically heated catalyst 4 is electrically energized. The details thereof will be described later.

In addition, in cases where a negative determination is made in step S401, the routine advances to step S103, in which it is determined whether the electrical energization to the electrically heated catalyst 4 has been completed. Then, in cases where an affirmative determination is made in step S103, the routine advances to step S405.

In step S405, the internal combustion engine 1 is started. At this time, fuel is supplied to the internal combustion engine 1. In this step, the internal combustion engine 1 is started in order to carry out failure detection.

In step S406, final or main failure determination processing is carried out. The main failure determination processing will be described later.

In step S407, the internal combustion engine 1 is stopped. That is, only during the time the main failure determination processing is carried out, the internal combustion engine 1 is caused to operate.

Figure 7:
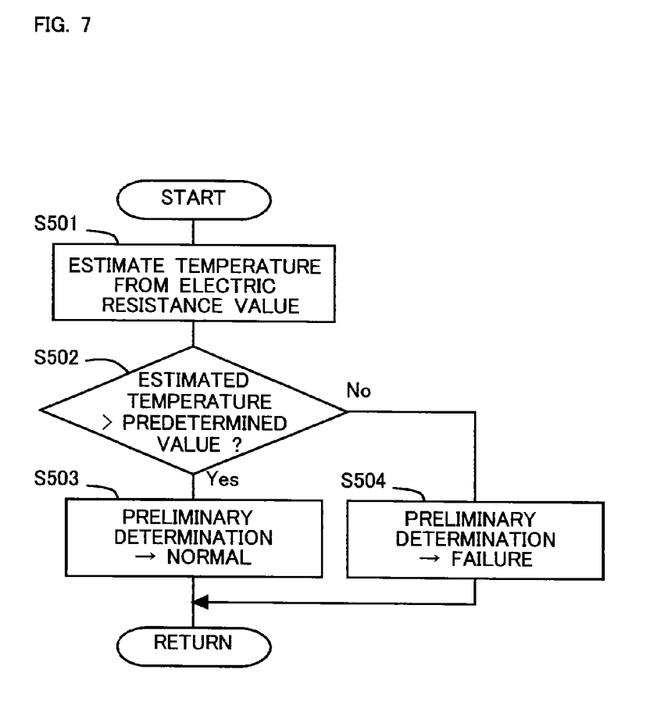
FIG. 7 is a flow chart showing a flow of tentative or preliminary failure determination processing.

Next, the preliminary failure determination processing carried out in step S404 will be explained. FIG. 7 is a flow chart showing a flow of the preliminary failure determination processing.

In step S501, the temperature of the electrically heated catalyst 4 is estimated from the electric resistance of the electrically heated catalyst 4. This estimation is obtained from the relation shown in FIG. 3. Here, note that in this embodiment, the ECU 10, which serves to detect the electric resistance of the electrically heated catalyst 4, corresponds to a resistance detection device in the present invention. Also, note that in this embodiment, the ECU 10, which serves to estimate the temperature of the electrically heated catalyst 4 in step S501, corresponds to an estimation device in the present invention.

In step S502, it is determined whether the temperature estimated in step S501 is higher than a predetermined value. The predetermined value referred to herein is an upper limit value of the temperature at which the electrically heated catalyst 4 is assumed to be in failure, and has been set in advance.

Then, in cases where an affirmative determination is made in step S502, the routine advances to step S503, in which according to a preliminary determination, the electrically heated catalyst 4 is assumed to be normal. On the other hand, in cases where a negative determination is made in step S502, the routine advances to step S504, in which according to a preliminary determination, the electrically heated catalyst 4 is assumed to be in failure. Here, even if the temperature is estimated based on the electric resistance of the electrically heated catalyst 4, the accuracy of estimation is low, so the accuracy of the preliminary determination is low. For this reason, failure detection of the electrically heated catalyst 4 only based on the estimated value of the temperature is not carried out, but instead, the failure detection is performed by using together the estimated value and the output value of the oxygen sensor 6 which will be described later.

Figure 8:
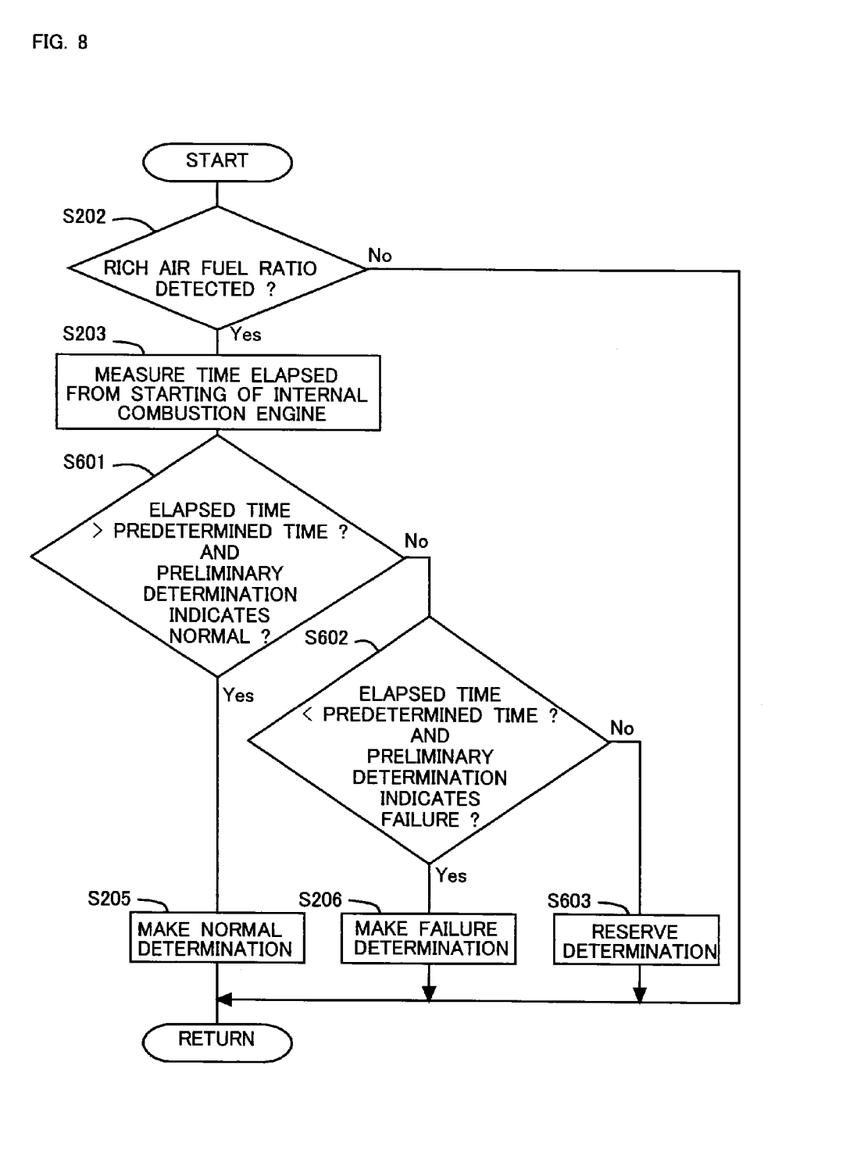
FIG. 8 is a flow chart showing a flow of final or main failure determination processing.

Next, the final or main failure determination processing carried out in step S406 will be explained. FIG. 8 is a flow chart showing a flow of the final or main failure determination processing. Here, note that for those steps in which the same processing as in the aforementioned flow charts is carried out, the same symbols are attached and an explanation thereof is omitted.

In step S601, it is determined whether the period of time elapsed from the starting of the internal combustion engine 1, which is measured in step S203, is longer than a predetermined period of time, and whether the electrically heated catalyst 4 has been assumed to be normal, in the above-mentioned preliminary determination. This predetermined period of time is the same as the predetermined period of time explained in step S204. Here, the fact that the period of time elapsed from the starting of the internal combustion engine 1, which is measured in step S203, is longer than a predetermined period of time means that the amount of oxygen stored in the catalyst has been sufficiently large, and hence, there is a high possibility that the electrically heated catalyst 4 is normal. In addition, in cases where the electrically heated catalyst 4 has been assumed to be normal, in the preliminary determination, too, there is a high possibility that the electrically heated catalyst 4 is normal. Accordingly, in this embodiment, when the elapsed period of time measured in step S203 is longer than the predetermined period of time, and when the electrically heated catalyst 4 has been assumed to be normal in the above-mentioned preliminary determination, a determination is made that the electrically heated catalyst 4 is normal.

That is, in cases where an affirmative determination is made in step S601, the routine advances to step S205, in which a determination is made that the electrically heated catalyst 4 is normal. On the other hand, in cases where a negative determination is made in step S601, the routine advances to step S602.

In step S602, it is determined whether the period of time elapsed from the starting of the internal combustion engine 1, which is measured in step S203, is shorter than the predetermined period of time, and whether the electrically heated catalyst 4 has been assumed to be in failure, in the above-mentioned preliminary determination. Here, the fact that the period of time elapsed from the starting of the internal combustion engine 1, which is measured in step S203, is shorter than the predetermined period of time means that the amount of oxygen stored in the catalyst is not sufficient, and hence, there is a high possibility that the electrically heated catalyst 4 is in failure. In addition, in cases where the electrically heated catalyst 4 has been assumed to be in failure in the preliminary determination, too, there is a high possibility that the electrically heated catalyst 4 is in failure. Accordingly, in this embodiment, when the elapsed period of time measured in step S203 is shorter than the predetermined period of time, and when the electrically heated catalyst 4 has been assumed to be in failure in the above-mentioned preliminary determination, a determination is made that the electrically heated catalyst 4 is in failure.

That is, in cases where an affirmative determination is made in step S602, the routine advances to step S206, in which a determination is made that the electrically heated catalyst 4 is in failure. On the other hand, in cases where a negative determination is made in step S602, the routine advances to step S603.

In step S603, a determination as to whether or not the electrically heated catalyst 4 is normal is reserved or suspended. That is, a final determination (main determination) is suspended because the elapsed period of time from the starting of the internal combustion engine 1 measured in step S203 and the result of the preliminary decision are contradictory to each other. For example, in cases where the operating state of the internal combustion engine 1 gets worse, the output value of the oxygen sensor 6 is not stabilized, which may result in an error in the measurement of the above-mentioned elapsed period of time. In such a case, by carrying out failure detection again, it is possible to enhance the accuracy of detection. Here, note that in step S603, a determination may be made that the electrically heated catalyst 4 is in failure.

Figure 9:
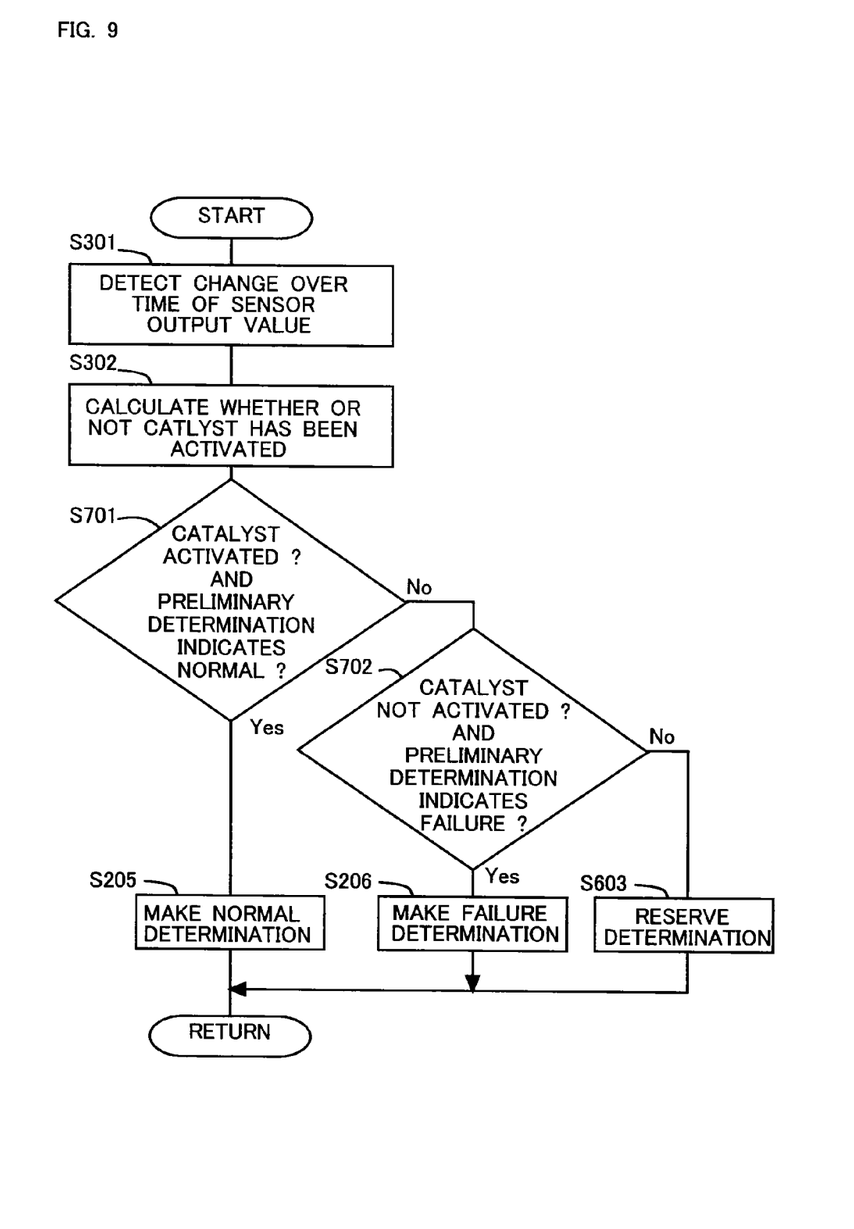
FIG. 9 is another flow chart showing a flow of final or main failure determination processing.

Here, note that in the final or main failure determination processing carried out in step S406, a determination can also be carried out by using the output values of the air fuel ratio sensor 5 and the oxygen sensor 6, as explained in the second embodiment. FIG. 9 is another flow chart showing a flow of the final or main failure determination processing. Here, note that for those steps in which the same processing as in the aforementioned flow charts is carried out, the same symbols are attached and an explanation thereof is omitted.

In step S701, it is determined whether the catalyst is assumed to have been activated in step S302, and whether the electrically heated catalyst 4 is assumed to be normal in the above-mentioned preliminary determination. The fact that it has been calculated in step S302 that the catalyst has been activated means that the amount of oxygen stored in the catalyst has been sufficiently large, and hence, there is a high possibility that the electrically heated catalyst 4 is normal. In addition, in cases where the electrically heated catalyst 4 has been assumed to be normal in the preliminary determination, too, there is a high possibility that the electrically heated catalyst 4 is normal. Accordingly, in this embodiment, when it is calculated in step S302 that the catalyst has been activated, and when the electrically heated catalyst 4 has been assumed to be normal in the above-mentioned preliminary determination, a determination is made that the electrically heated catalyst 4 is normal.

That is, in cases where an affirmative determination is made in step S701, the routine advances to step S205, in which a determination is made that the electrically heated catalyst 4 is normal. On the other hand, in cases where a negative determination is made in step S701, the routine advances to step S702.

In step S702, it is determined whether the catalyst is assumed to have not been activated in step S302, and whether the electrically heated catalyst 4 is assumed to be in failure in the above-mentioned preliminary determination. The fact that it has been calculated in step S302 that the catalyst has not been activated means that the amount of oxygen stored in the catalyst is not sufficient, and hence, there is a high possibility that the electrically heated catalyst 4 is in failure. In addition, in cases where the electrically heated catalyst 4 has been assumed to be in failure in the preliminary determination, too, there is a high possibility that the electrically heated catalyst 4 is in failure. Accordingly, in this embodiment, when it is calculated in step S302 that the catalyst has not been activated, and when the electrically heated catalyst 4 has been assumed to be in failure in the above-mentioned preliminary determination, a determination is made that the electrically heated catalyst 4 is in failure.

That is, in cases where an affirmative determination is made in step S702, the routine advances to step S206, in which a determination is made that the electrically heated catalyst 4 is in failure. On the other hand, in cases where a negative determination is made in step S702, the routine advances to step S603.

As described above, according to this embodiment, by using together a failure determination based on the oxygen sensor 6, and a failure determination based on the electric resistance, it is possible to further enhance the accuracy in the failure detection of the electrically heated catalyst 4.

EXPLANATION OF REFERENCE NUMERALS AND CHARACTERS 1 internal combustion engine
2 electric motor
3 exhaust passage
4 electrically heated catalyst
5 air fuel ratio sensor
6 oxygen sensor
10 ECU

The invention claimed is:

1. A failure detection apparatus for an electrically heated catalyst which is arranged in an exhaust passage of an internal combustion engine and is electrically energized to generate heat thereby to heat a catalyst, said apparatus comprising:
  an air fuel ratio control device that adjusts an air fuel ratio of an exhaust gas flowing into said electrically heated catalyst to a rich air fuel ratio, at the time of starting of said internal combustion engine;
  a downstream side detection device that is arranged at the downstream side of said electrically heated catalyst and detects a concentration of oxygen in the exhaust gas; and
  a determination device that determines whether said electrically heated catalyst is electrically energized, based on the time at which the oxygen concentration detected by said downstream side detection device changes to a value indicating a rich air fuel ratio at the time when the air fuel ratio of the exhaust gas is adjusted by said air fuel ratio control device to a rich air fuel ratio, after starting of said internal combustion engine.

2. The failure detection apparatus for an electrically heated catalyst as set forth in claim 1, wherein
  said determination device makes a determination that electrical energization to said electrically heated catalyst is carried out normally, in cases where a period of time after said internal combustion engine is started until the oxygen concentration detected by said downstream side detection device changes to a value indicating a rich air fuel ratio is longer than a predetermined period of time; and
  said determination device makes a determination that electrical energization to said electrically heated catalyst is not carried out normally, in cases where said period of time is equal to or less than said predetermined period of time.

3. The failure detection apparatus for an electrically heated catalyst as set forth in claim 1, further comprising:
  an upstream side detection device that is arranged at the upstream side of said electrically heated catalyst and detects a concentration of oxygen in the exhaust gas; and
  said determination device makes a determination that electrical energization to said electrically heated catalyst is carried out normally, in cases where a period of time after said internal combustion engine is started until the oxygen concentrations detected by said upstream side detection device and said downstream side detection device both change to values indicating rich air fuel ratios, respectively, is longer than a predetermined period of time; and
  said determination device makes a determination that electrical energization to said electrically heated catalyst is not carried out normally, in cases where said period of time is equal to or less than said predetermined period of time.

4. The failure detection apparatus for an electrically heated catalyst as set forth in claim 1, wherein
  said electrically heated catalyst is electrically energized from before starting of said internal combustion engine.

5. The failure detection apparatus for an electrically heated catalyst as set forth in claim 1, wherein
  a resistance detection device that detects an electric resistance of said electrically heated catalyst when said electrically heated catalyst is electrically energized; and an estimation device that estimates a temperature of said electrically heated catalyst based on the electric resistance detected by said resistance detection device;

wherein said determination device determines whether or not said electrically heated catalyst is electrically energized, when the temperature of said electrically heated catalyst estimated by said estimation device is higher than a predetermined value.

6. The failure detection apparatus for an electrically heated catalyst as set forth in claim 1, wherein a resistance detection device that detects an electric resistance of said electrically heated catalyst when said electrically heated catalyst is electrically energized; and an estimation device that estimates a temperature of said electrically heated catalyst based on the electric resistance detected by said resistance detection device;

wherein said determination device makes a determination that said electrically heated catalyst is electrically energized, only in cases where the temperature of said electrically heated catalyst estimated by said estimation device is higher than a predetermined value.

* * * * *